(12) United States Patent
Chopra et al.

(10) Patent No.: US 11,119,867 B1
(45) Date of Patent: Sep. 14, 2021

(54) SYSTEM AND METHOD FOR BACKUP STORAGE SELECTION

(71) Applicant: EMC IP Holding Company LLC, Hopkinton, MA (US)

(72) Inventors: Shelesh Chopra, Bangalore (IN); Jaishree Balasubramanian, Bangalore (IN); Sujan Kumar Shetty, Udupi (IN)

(73) Assignee: EMC IP Holding Company LLC, Hopkinton, MA (US)

(*) Notice: Subject to any disclaimer, the term of this patent is extended or adjusted under 35 U.S.C. 154(b) by 94 days.

(21) Appl. No.: 16/802,087

(22) Filed: Feb. 26, 2020

(51) Int. Cl.
| | |
|---|---|
| *G06F 12/00* | (2006.01) |
| *G06F 11/14* | (2006.01) |
| *G06F 9/48* | (2006.01) |
| *G06F 11/30* | (2006.01) |
| *G06F 9/50* | (2006.01) |

(52) U.S. Cl.
CPC .......... *G06F 11/1464* (2013.01); *G06F 9/485* (2013.01); *G06F 9/5027* (2013.01); *G06F 11/1451* (2013.01); *G06F 11/1461* (2013.01); *G06F 11/1469* (2013.01); *G06F 11/3034* (2013.01)

(58) Field of Classification Search
CPC ............ G06F 11/1464; G06F 11/1451; G06F 11/1461; G06F 11/1469; G06F 11/3034; G06F 9/485; G06F 9/5027
See application file for complete search history.

(56) References Cited

U.S. PATENT DOCUMENTS

| | | | |
|---|---|---|---|
| 8,868,726 B1* | 10/2014 | Tu ........................... | H04L 67/18 709/224 |
| 2008/0154979 A1* | 6/2008 | Saitoh ................. | G06F 11/1464 |
| 2020/0285542 A1* | 9/2020 | Deshpande ......... | G06F 11/1451 |

* cited by examiner

*Primary Examiner* — Shawn X Gu
(74) *Attorney, Agent, or Firm* — Chamberlain, Hrdlicka, White, Williams & Aughtry

(57) ABSTRACT

A backup orchestrator for providing backup services to entities includes storage for storing backup windows during which backup storages are predicted to be able to service backup storage workloads; and a backup manager that identifies an occurrence of a backup generation event for an entity of the entities; in response to identifying the backup generation event: matches workload characteristics for generating a backup of the entity to a backup window of the backup windows that is associated with a backup storage of the backup storages; and generates the backup for the entity during the backup window and store the backup in the backup storage.

20 Claims, 9 Drawing Sheets

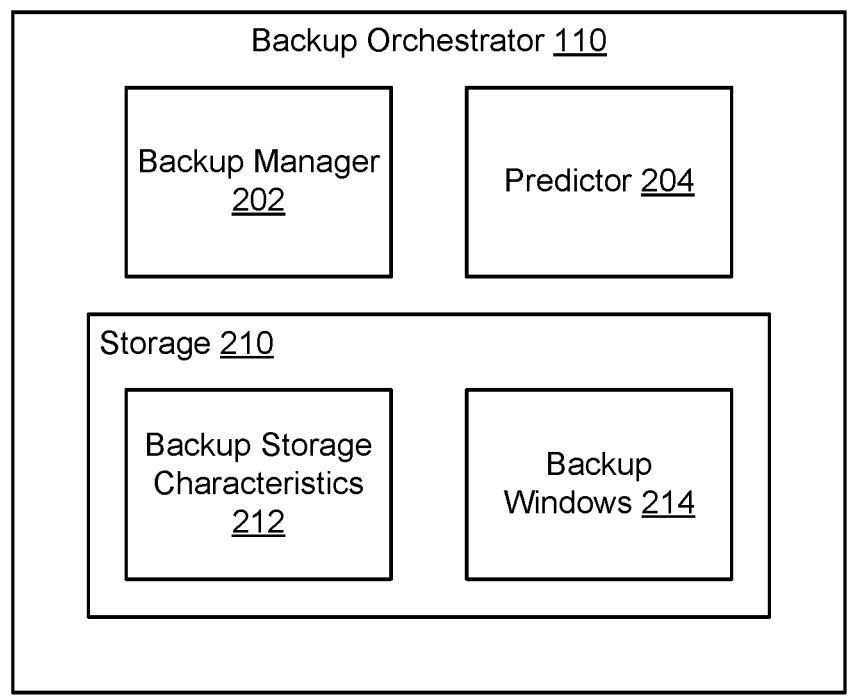
FIG. 2.1

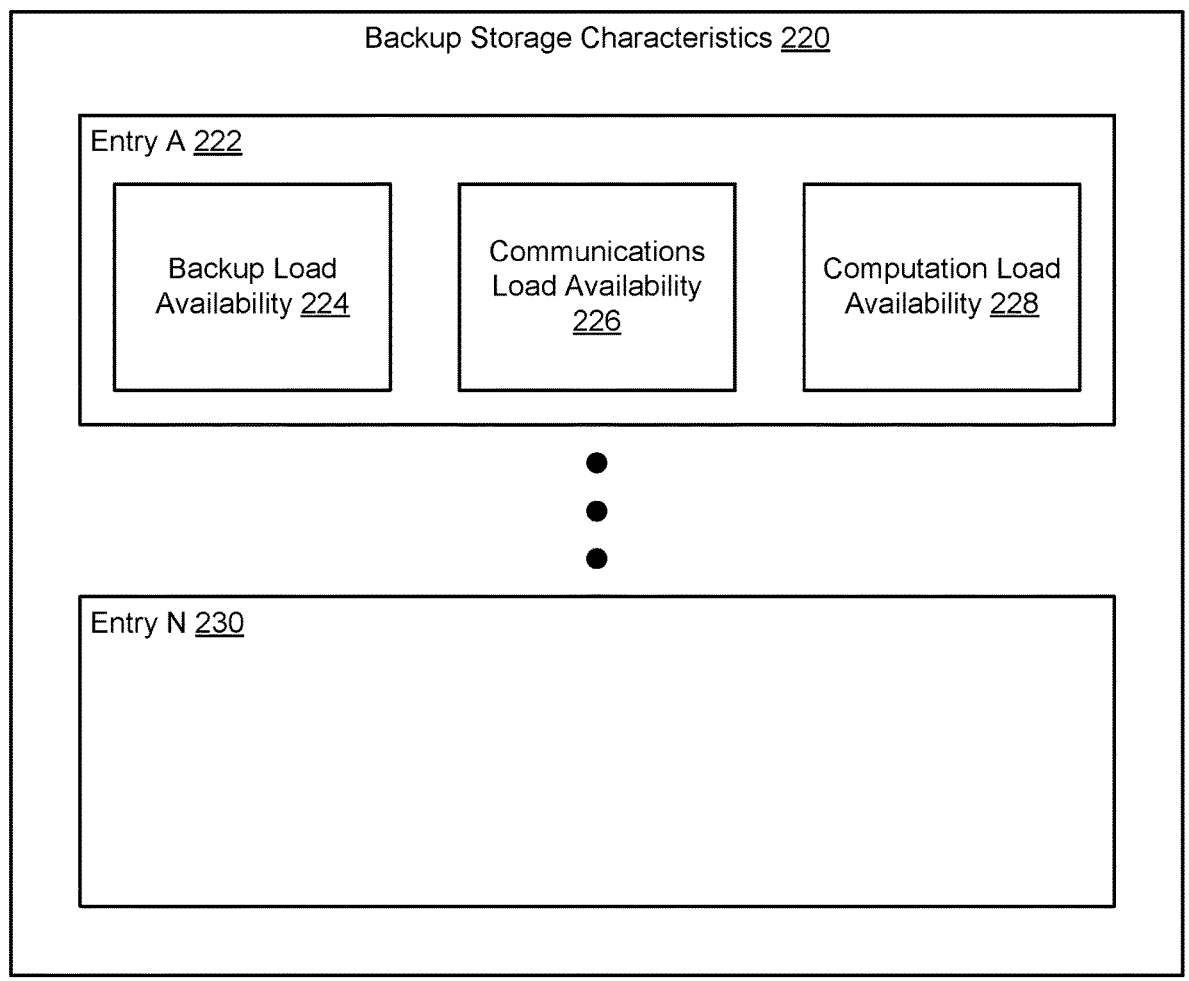
FIG. 2.2

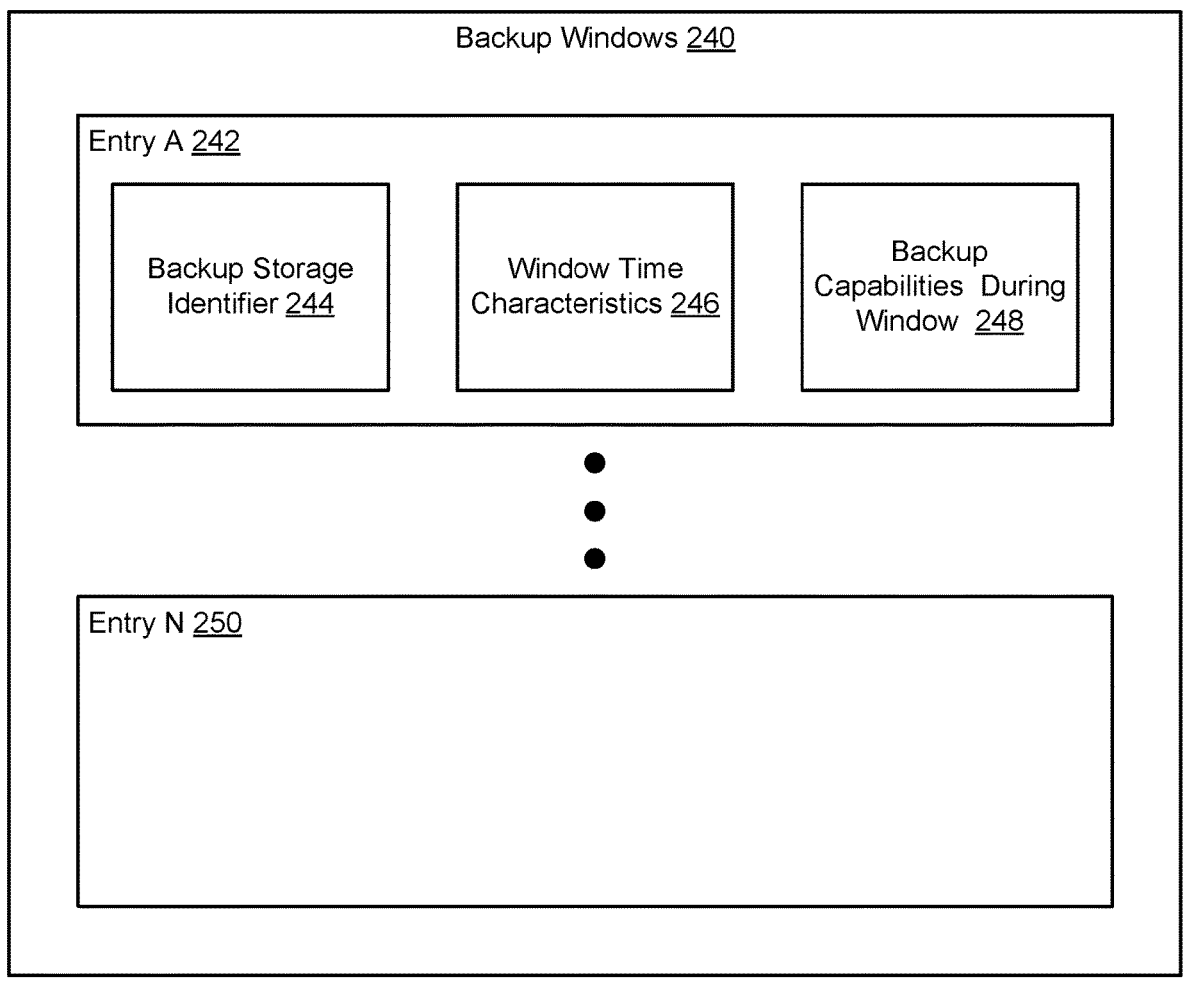
FIG. 2.3

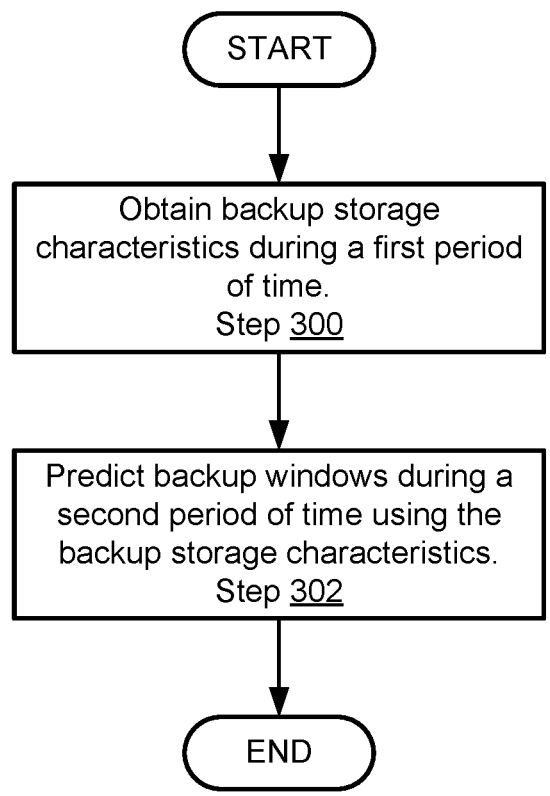
FIG. 3.1

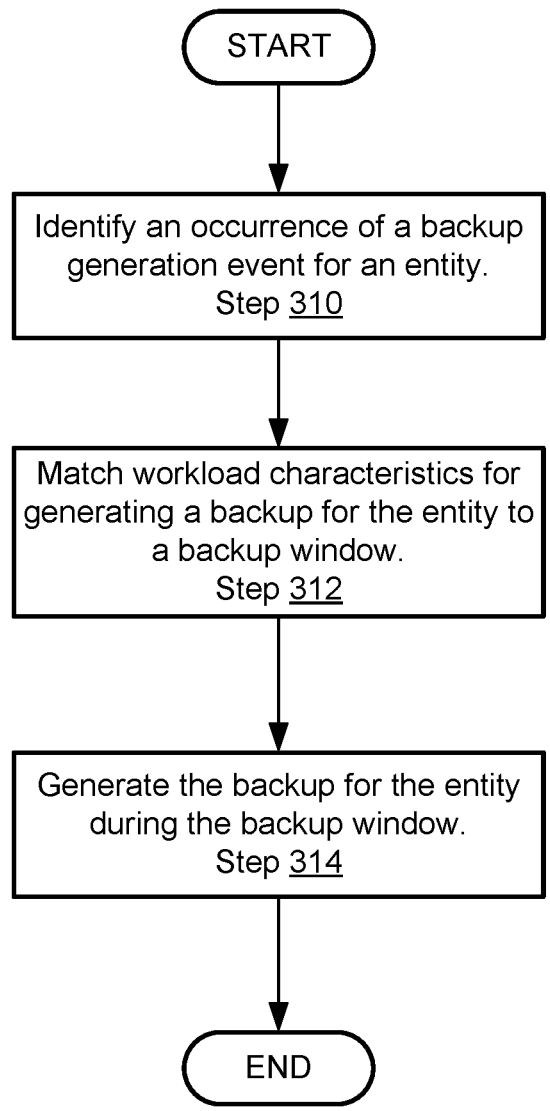
FIG. 3.2

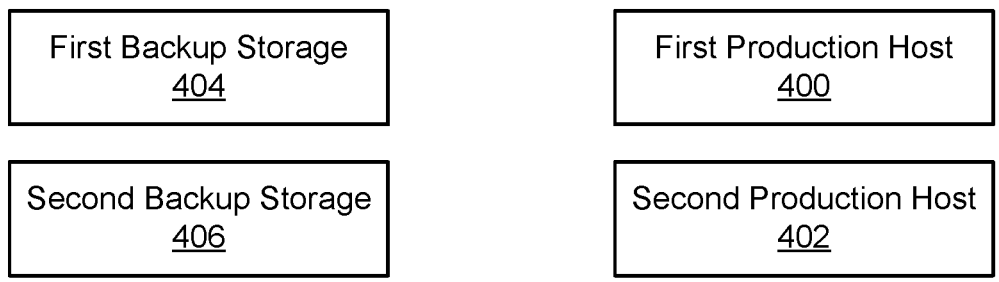
FIG. 4.1

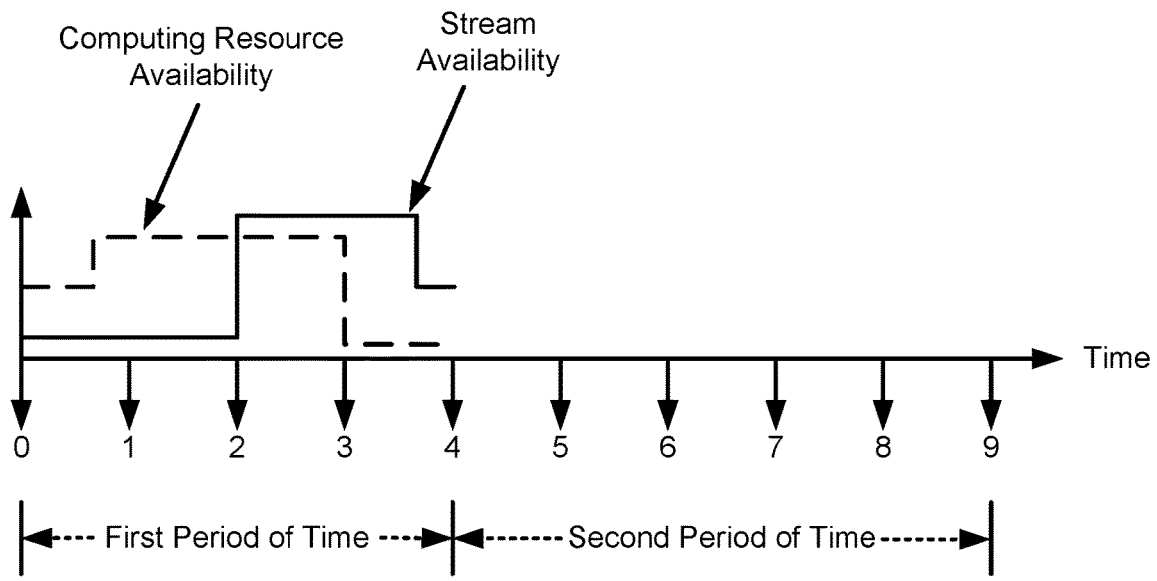
FIG. 4.2
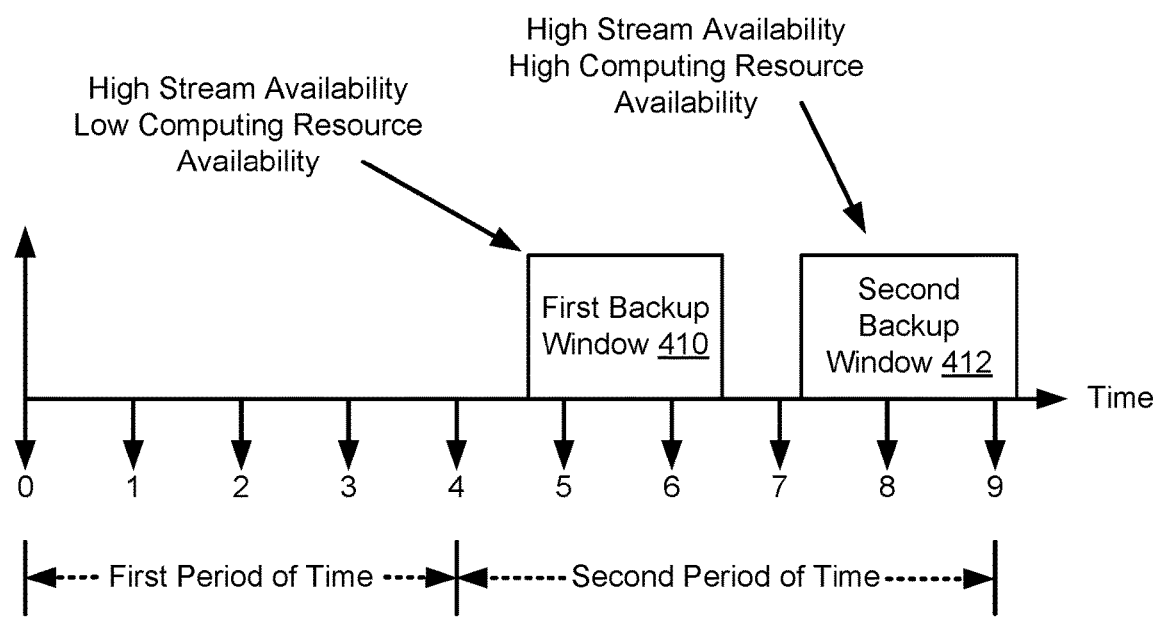
FIG. 4.3

US 11,119,867 B1

SYSTEM AND METHOD FOR BACKUP STORAGE SELECTION

BACKGROUND

Computing devices may generate data during their operation. For example, applications hosted by the computing devices may generate data used by the applications to perform their functions. Such data may be stored in persistent storage of the computing devices. Failure of the persistent storage may result in data loss.

When data is lost due to device failure, software failure, etc., the data may be unrecoverable if no copies of the data were made and stored in locations other than the persistent storage.

SUMMARY

In one aspect, a backup orchestrator for providing backup services to entities in accordance with one or more embodiments of the invention includes storage for storing backup windows during which backup storages are predicted to be able to service backup storage workloads; and a backup manager that identifies an occurrence of a backup generation event for an entity of the entities; in response to identifying the backup generation event: matches workload characteristics for generating a backup of the entity to a backup window of the backup windows that is associated with a backup storage of the backup storages; and generates the backup for the entity during the backup window and store the backup in the backup storage.

In one aspect, a method for providing backup services to entities in accordance with one or more embodiments of the invention includes identifying an occurrence of a backup generation event for an entity of the entities; in response to identifying the backup generation event: matching workload characteristics for generating a backup of the entity to a backup window that is associated with a backup storage of the backup storages, wherein the backup window specifies a period of time during which the backup storage is predicted to be able to service backup storage workloads; and generating the backup for the entity during the backup window and storing the backup in the backup storage.

In one aspect, a non-transitory computer readable medium in accordance with one or more embodiments of the invention includes computer readable program code, which when executed by a computer processor enables the computer processor to perform a method for providing backup services to entities, the method includes identifying an occurrence of a backup generation event for an entity of the entities; in response to identifying the backup generation event: matching workload characteristics for generating a backup of the entity to a backup window that is associated with a backup storage of the backup storages, wherein the backup window specifies a period of time during which the backup storage is predicted to be able to service backup storage workloads; and generating the backup for the entity during the backup window and storing the backup in the backup storage.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2.1 shows a diagram of an example backup orchestrator in accordance with one or more embodiments of the invention.

FIG. 2.2 shows a diagram of a backup storage characteristics data structure in accordance with one or more embodiments of the invention.

FIG. 2.3 shows a diagram of a backup windows data structure in accordance with one or more embodiments of the invention.

FIG. 3.1 shows a flowchart of a method of obtaining backup windows in accordance with one or more embodiments of the invention.

FIG. 3.2 shows a flowchart of a method of providing backup orchestration services in accordance with one or more embodiments of the invention.

FIG. 4.1 shows a diagram of a non-limiting example of a system in accordance with embodiments of the invention.

FIGS. 4.2-4.3 show diagrams of a process of identifying backup windows by the system of FIG. 4.1 in accordance with embodiments of the invention.

DETAILED DESCRIPTION

Figure 1:
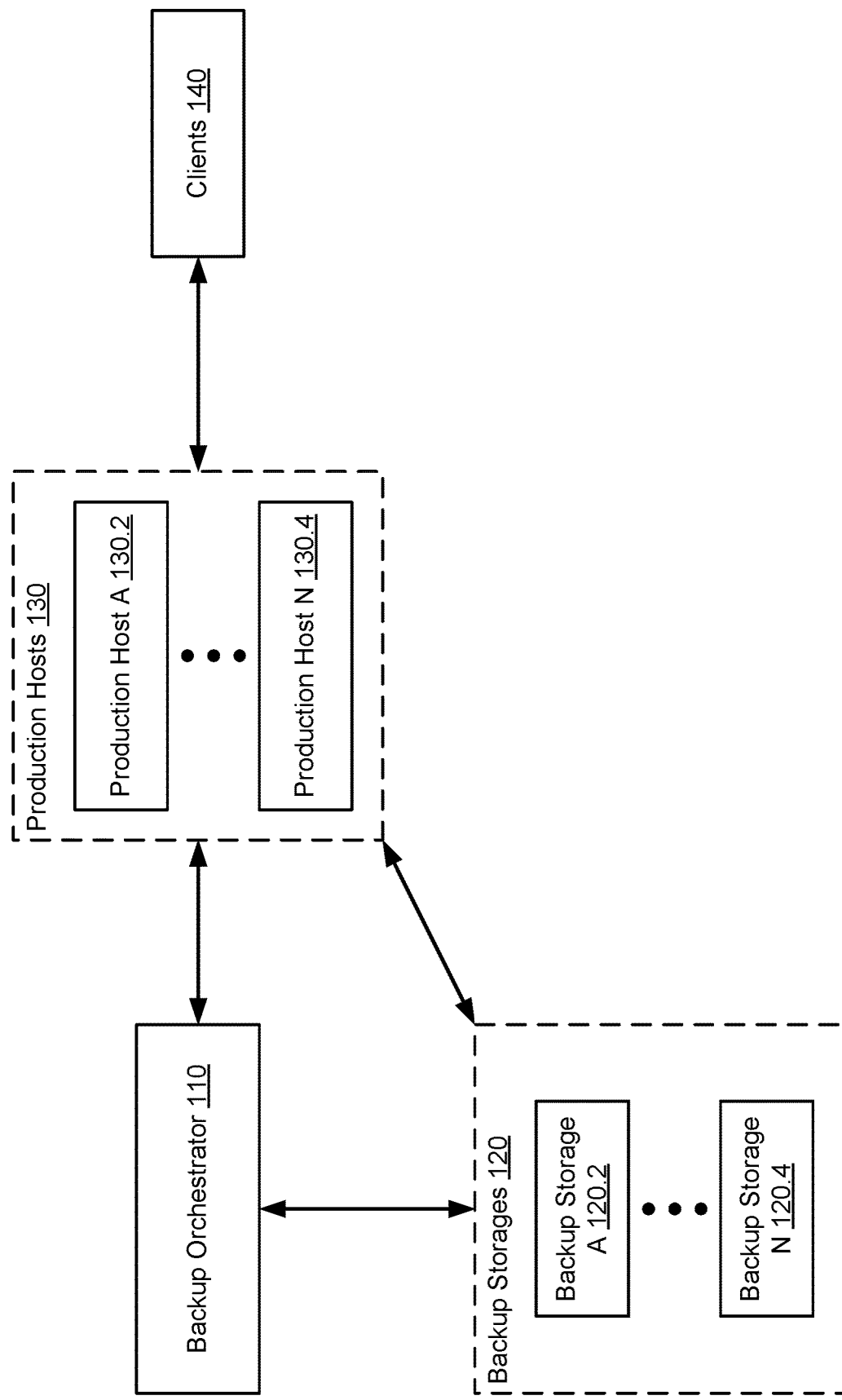
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for providing data protection services in a distributed system. Specifically, embodiments of the invention may provide a system that selectively assigns backup storages to store generated backups.

To selectively assign backup storages for backup storage purposes, a system in accordance with embodiments of the invention may use forecasting to identify periods (e.g., backup windows) of time during which backup storages are likely to be able to service a backup workload (e.g., storing a backup). To do so, the system may collect information regarding the operation of the backup storage over time. The collected information may be used to generate predictions of the likely future capabilities of the backup storages in the future. The predicted future capabilities may be used to identify (i) the periods of time and (ii) the likely capabilities of the backup storages during each of the periods of time.

The system may schedule backup generations and assign storages to service the resulting backup workloads. By doing so, assignment of backup storages to service backup workloads for which the backup storages lacks sufficient resources may be prevented and/or have a reduced likelihood of occurring. If a backup storage lacks sufficient resources for servicing a backup workload, servicing of the workload may take a longer than expected time or may fail.

Consequently, the system may be better able to meet data protection goals that may specify, in part, (i) how long an entity can wait to complete a backup, (ii) how much data of an entity may be in an unbacked up state, and/or (iii) other requirements that specify how and/or when backups should generated.

FIG. 1 shows an example system in accordance with one or more embodiments of the invention. The system may include clients (140) that obtain services from virtual machines and/or applications hosted by production hosts (130). For example, the production hosts (130) may host virtual machines that host applications. The clients (140) may utilize application services provided by the applications. The applications may be, for example, database applications, electronic communication applications, file storage applications, and/or any other type of application that may provide services to the clients (140). By utilizing these services, data that is relevant to the clients (140) may be stored in the production hosts (130).

To improve the likelihood that data stored in the production hosts (130) is available for future use, backups of the production hosts (130) may be generated and stored in the backup storages (120). A backup of one of the production hosts (130) may include data that may be used to restore all, or a portion, of the production host's data, or all, or a portion, of the data used by an entity hosted by the production host, to a previous state. Thus, if data hosted by one of the production hosts (130) is lost, access to the data may be restored by restoring all, or a portion, of the production host's data using information stored in the backup storages (120).

The system may also include a backup orchestrator (110) that provides, in part, data protection services to the production hosts (130). The data protection services may include orchestrating the generation of backups for the production hosts (130), orchestrating storage of the backups in backup storages (120), and/or orchestrating restoration of the production hosts (130) using backups stored in the backup storages (120) and/or other locations.

To orchestrate backup generation and storage, the backup orchestrator (110) may identify periods of time during which the backup storages (120) are likely to be capable of servicing the backup workloads imposed on them by the production hosts (130) during backup generation. At any point in time, the backup storages (120) may be (i) servicing backup workloads and/or (ii) performing other types of tasks. Performing these functions may limit the ability of each of the respective backup storages (120) to service backup workloads.

If a backup storage begins to service a backup workload but is unable to service it due to, for example, lack of communications bandwidth, the backup servicing provided to a production host that is imposing the backup workload may be impaired. For example, the backup workload may be serviced more slowly than desired potentially resulting in a portion of the production host's data being in an unbacked up state (e.g., unable to be restored using data stored in the backup storages (120)) for longer than planned for by the production host. Consequently, the production host may be unable to meet expectations regarding the backup state of its data. Accordingly, should a data loss event occur while the portion of the production host's data is in the unbacked up state, data may be permanently lost.

To prevent data loss, the backup orchestrator (110) may identify periods of time (e.g., backup windows) during which the backup storages (120) will be likely able to service different types of backup workloads. The backup orchestrator (110) may ensure that the production hosts impose backup workloads during the backup windows that match the type of backup workloads that the backup storages (120) are likely to be able to service. By doing so, the production hosts (130) may be more likely to be able to meet their expectations regarding the backup state of their data. Accordingly, the likelihood of permanent data loss events occurring may be reduced.

The components of the system illustrated in FIG. 1 may be operably connected to each other and/or operably connected to other entities (not shown) via any combination of wired and/or wireless networks. Each component of the system illustrated in FIG. 1 is discussed below.

The clients (140) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 3.1-3.2. The clients (140) may be implemented using other types of computing devices without departing from the invention. For additional details regarding computing devices, refer to FIG. 5.

The clients (140) may be implemented using logical devices without departing from the invention. For example, the clients (140) may be implemented using virtual machines that utilize computing resources of any number of physical computing devices to provide the functionality of the clients (140). The clients (140) may be implemented using other types of logical devices without departing from the invention.

In one or more embodiments of the invention, the clients (140) utilize application services provided by the production hosts (130). For example, the clients (140) may utilize database services, electronic communication services, file storage services, or any other type of computer implemented service provided by applications hosted by the production hosts (130). By utilizing the aforementioned services, data that is relevant to the clients (140) may be stored as part of application data of the applications hosted by the production hosts (130).

For example, consider a scenario in which a client utilizes file storage services, provided by an application hosted by the production hosts (130), by uploading an image to an application hosted by the production hosts (130). In response to receiving the uploaded image, the application may store a copy of the image locally in the production hosts (130). At a future point in time, the client that uploaded the image, or another entity, may desire to retrieve a copy of the image from the production hosts (130) and thereby render data, i.e., the copy of the image sort of the production hosts (130), stored in the production hosts (130) to be relevant to the clients (140). One or more embodiments of the invention may improve the likelihood that data that is relevant to the clients (140) and stored in the production hosts (130) is retrievable from the production hosts (130) at future points in time. Embodiments of the invention may provide such functionality by generating and storing backups of the production hosts (130), or a portion of the data of the production hosts, in the backup storages (120).

In one or more embodiments of the invention, the production hosts (130) are implemented using computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 3.1-3.2. The production hosts (130) may be implemented using other types of computing devices without departing from the invention. For additional details regarding computing devices, refer to FIG. 5.

In one or more embodiments of the invention, the production hosts (130) are implemented using distributed computing devices. As used herein, a distributed computing device refers to functionality provided by a logical device that utilizes the computing resources of one or more separate and/or distinct physical computing devices. For example, in one or more embodiments of the invention, the production hosts (130) may be implemented using distributed devices that include components distributed across any number of separate and/or distinct computing devices. In such a scenario, the functionality of the production hosts (130) may be performed by multiple, different computing devices without departing from the invention.

The production hosts (130) may be implemented using logical devices without departing from the invention. For example, the production hosts (130) may be implemented using virtual machines that utilize computing resources of any number of physical computing devices to provide the functionality of the production hosts (130). The production hosts (130) may be implemented using other types of logical devices without departing from the invention.

A system in accordance with one or more embodiments of the invention may include any number of production hosts (e.g., 130.2, 130.4) without departing from the invention. For example, a system may include a single production host (e.g., 130.2) or multiple production hosts (e.g., 130.2, 130.4).

In one or more embodiments of the invention, the production hosts (130) provide services to the clients (140). The services may include any type of computer implemented service such as, for example, database services, electronic communication services, data storage services, and/or instant messaging services. When providing such services to the clients (140), data that is relevant to the clients (140) may be stored in persistent storage of the production hosts (130).

In one or more embodiments of the invention, the production hosts (130) provide backup generation services. Backup generation services may include (i) identifying a backup storage that is likely to be able to service its backup generation workloads, (ii) generating backups, and (iii) storing the backups in the identified storage.

To identify the backup storage, the production hosts (130) may utilize information provided by the backup orchestrator (110). For example, the backup orchestrator (110) may specify which backup storage of the backup storages (120) is to be used to store each backup generated by the production hosts. The backup storage used to store each backup may change or be similar. As will be discussed in greater detail below, the selection may be based on (i) the characteristics of the workload that will be imposed on a backup storage for storing one or more backups and (ii) the predicted availability of resources of the backup storages for servicing the backup workload.

To enable the backup orchestrator (110) to determine which backup storage is to service a backup workload, the production host that will impose the backup workload on the backup storage may provide information regarding the backup workload. The information may include, for example, a quantity of data that will be transmitted, a frequency at which backups will be generated, a type of entity (e.g., application) that is generating the data that will be included in the backup, a number of concurrent streams desired to service the backup workload, a maximum duration of time for performing the backup workload (e.g., to meet expectations regarding the backup state of data), and/or other characteristics that may enable the backup orchestrator (110) to better select backup storages to service backup workloads.

In one or more embodiments of the invention, the backup storages (120) are implemented using computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to provide the functionality of the backup storages (120) described through this application and all, or a portion, of the methods illustrated in FIGS. 3.1-3.2. The backup storages (120) may be implemented using other types of computing devices without departing from the invention. For additional details regarding computing devices, refer to FIG. 5.

In one or more embodiments of the invention, the backup storages (120) are implemented using distributed computing devices. As used herein, a distributed computing device refers to functionality provided by a logical device that utilizes the computing resources of one or more separate and/or distinct computing devices. For example, in one or more embodiments of the invention, the backup storages (120) are implemented using distributed devices that include components distributed across any number of separate and/or distinct computing devices. In such a scenario, the functionality of the backup storages (120) may be performed by multiple, different computing devices without departing from the invention.

In one or more embodiments of the invention, the backup storages (120) provide data storage services to the production hosts (130). The data storage services may include storing of data provided by the production hosts (130) and providing of previously stored data to the production hosts (130). Such provided data may be used for restoration (and/or other) purposes. The system may include any number of backup storages (e.g., 120.2, 120.4) without departing from the invention. For example, the system in accordance with embodiments of the invention may only include a single backup storage (e.g., 120.2) or may include multiple backup storages (e.g., 120.2, 120.4).

In one or more embodiments of the invention, the data stored in the backup storages (120) includes backups of virtual machines hosted by the production hosts (130). For example, the production hosts (130) may host a virtual machine that hosts a database application. To generate backups of the database, a backup of the virtual machine hosting the database may be generated and the backup may be sent to the backup storages (120) for storage. At a future point in time, it may become desirable to restore the state of the database managed by the database application to a previous state. To do so, the previously stored backup of the virtual machine stored in the backup storages (120) may be retrieved. The retrieved backup may be used, alone or in combination with other backups, to restore the application data hosted by the virtual machine hosting the database to a state associated with the backup, i.e., the desired previous state.

In one or more embodiments of the invention, the data stored in the backup storages (120) includes backups of applications hosted by the production hosts (130). For example, the production hosts (130) may host a virtual machine that hosts any number of applications. At a future point in time, it may become desirable to restore the state of the applications hosted by the virtual machine to a previous state. To do so, previously stored application level backups may be utilized to selectively restore states of the applications to prior states associated with the application level backups.

In one or more embodiments of the invention, the backup storages (120) provide information regarding (i) the backup workloads that they service, (ii) their availability to service backup workloads over time, (iii) their communications load availability (e.g., how much of their communications bandwidth/number of concurrent streams is unallocated), and/or (iv) their computational load availability (e.g., computational resources such as processor cycles, memory space, storage space, etc. that is unallocated). The backup storages (120) may provide the aforementioned information over time.

The information provided to the backup orchestrator may be obtained by monitoring capabilities and workloads being performed by the respective backup storage. The monitoring may be performed, for example, continuously, periodically (e.g., sampled), etc. The information may include any quantity of information (e.g., all or a portion of the information described above and/or additional information not described that may be used by the backup orchestrator to decide how to assign backup workloads to be serviced by the backup storages). The information may be provided to the backup orchestrator via any method (e.g., inclusion in a data structure that is provided to the backup orchestrator via a message, publishing of a data structure that includes the information and to which the backup orchestrator is subscribed, storing a data structure that includes the information in a location accessible to the backup orchestrator, etc.).

In one or more embodiments of the invention, the backup orchestrator (110) is implemented using computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to provide the functionality of the backup orchestrator (110) described through this application and all, or a portion, of the methods illustrated in FIGS. 3.1-3.2. The backup orchestrator (110) may be implemented using other types of computing devices without departing from the invention. For additional details regarding computing devices, refer to FIG. 4.

In one or more embodiments of the invention, the backup orchestrator (110) is implemented using distributed computing devices. As used herein, a distributed computing device refers to functionality provided by a logical device that utilizes the computing resources of one or more separate and/or distinct computing devices. For example, in one or more embodiments of the invention, the backup orchestrator (110) is implemented using distributed devices that include components distributed across any number of separate and/or distinct computing devices. In such a scenario, the functionality of the backup orchestrator (110) may be performed by multiple, different computing devices without departing from the invention.

In one or more embodiments of the invention, the backup orchestrator (110) provides backup orchestration services. Backup orchestration services may include (i) obtaining information regarding the operation of the backup storages (120), (ii) generating predictions, based on the obtained information, of periods of time (e.g., backup windows) during which it is likely that the backup storages (120) will be able to service backup workloads, and (iii) orchestrating storage of backups generated by the production hosts (130) during backup windows and in backup storages that are able to service a type of backup workload that will be placed on the backup storages for storing the backups. For additional details regarding the backup orchestrator (110), refer to FIG. 2.1.

While the system of FIG. 1 has been described and illustrated as including a limited number of components for the sake of brevity, a system in accordance with embodiments of the invention may include additional, fewer, and/or different components than those illustrated in FIG. 1 without departing from the invention.

As discussed above, backup orchestrators may assign backup storages to service backup workloads. FIG. 2.1 shows a diagram of the backup orchestrator (110) in accordance with one or more embodiments of the invention. As discussed above, the backup orchestrator (110) may provide backup orchestration services.

To provide the aforementioned functionality of the backup orchestrator (110), the backup orchestrator (110) may include a backup manager (202), a predictor (204), and storage (210). Each component of the backup orchestrator (110) is discussed below.

The backup manager (202) may provide backup management services. The backup management services may include (i) obtaining information (e.g., backup storage characteristics (212)) regarding the operation of the backup storages, (ii) invoking the functionality of the predictor (204) to identify backup windows, and/or (iii) orchestrating storage of backups generated by the production hosts during the backup windows in backup storages associated with the respective backup windows.

When providing its functionality, the backup manager (202) may utilize the storage (210) by storing data structures including information used by the predictor (204) to generate the backup windows (214). For additional details regarding data structures that may be utilized by the backup manager (202) when providing its functionality, refer to FIGS. 2.2-2.3.

To provide the above noted functionality of the backup manager (202), the backup manager (202) may perform all, or a portion, of the methods illustrated in FIGS. 3.1-3.2.

In one or more embodiments of the invention, the backup manager (202) is implemented using a hardware device including circuitry. The backup manager (202) may be implemented using, for example, a digital signal processor, a field programmable gate array, or an application specific integrated circuit. The backup manager (202) may be implemented using other types of hardware devices without departing from the invention.

In one or more embodiments of the invention, the backup manager (202) is implemented using computing code stored on a persistent storage that when executed by a processor performs all, or a portion, of the functionality of the backup manager (202). The processor may be a hardware processor including circuitry such as, for example, a central processing unit or a microcontroller. The processor may be other types of hardware devices for processing digital information without departing from the invention.

The predictor (204) may provide prediction services. Prediction services may include (i) generating predictions of periods of time during which backup storages are likely to be able to service backup workloads, (ii) identify the types of resources that are likely to be available to the backup storages for servicing backup workloads during each of the predicted periods of time, and (iii) generate the backup windows (214) using the periods of time and the types of resources that are likely to be available.

In one or more embodiments of the invention, the predictor (204) implements a forecasting algorithm that takes, as input, the backup storage characteristics (212) and provides, as output, the predicted periods of time and/or likely available resources during each of the respective periods of time. The forecasting algorithm may be, for example, a machine learning algorithm, stochastic modeling, or any other type of method that may be used to generate the aforementioned predictions. The machine learning algorithm may be, for example, a time series forecasting algorithm.

The predictor (204) may use the output of the forecasting algorithm to populate the backup windows (214) data structure. The resulting data structure may include information that may be used to assign backup storages to service backup workloads in a manner that is likely to result in servicing of the workloads without negatively impacting the operation of the system and/or limiting the ability of the production hosts to meet their data protection goals.

In one or more embodiments disclosed herein, the storage (210) is implemented using devices that provide data storage services (e.g., storing data and providing copies of previously stored data). The devices that provide data storage services may include hardware devices and/or logical devices. For example, storage (210) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (210) may include a memory device (e.g., a dual in line memory device) in which data is stored and from which copies of previously stored data are provided. In another example, storage (210) may include a persistent storage device (e.g., a solid state disk drive) in which data is stored and from which copies of previously stored data is provided. In a still further example, storage (210) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (210) may store data structures including backup storage characteristics (212) and backup windows (214). Each of these data structures is discussed below.

The backup storage characteristics (212) may be implemented using one or more data structures. The data structures may include information regarding the backup storages. The information included in the backup storage characteristics (212) may be used to generate the backup windows. For additional details regarding the backup storage characteristics, refer to FIG. 2.2.

The backup windows (214) may be implemented using one or more data structures. The data structures may include information regarding periods of time during which backup storages are likely able to service backup workloads in a desired manner. The information included in the backup windows (214) may be generated using the backup storage characteristics. For additional details regarding the backup windows, refer to FIG. 2.3.

While the data structures stored in storage (210) have been described as including a limited amount of specific information, any of the data structures stored in storage (210) may include additional, less, and/or different information without departing from the embodiments disclosed herein. Further, the aforementioned data structures may be combined, subdivided into any number of data structures, may be stored in other locations (e.g., in a storage hosted by another device), and/or spanned across any number of devices without departing from the embodiments disclosed herein.

While the backup orchestrator (110) of FIG. 2.1 has been described and illustrated as including a limited number of components for the sake of brevity, a backup orchestrator in accordance with embodiments of the invention may include additional, fewer, and/or different components than those illustrated in FIG. 2.1 without departing from the invention.

As discussed above, the backup orchestrator (110) may utilize data structures to provide its functionality. FIGS. 2.2-2.3 show diagrams of data structures that may be used by the backup orchestrator (110) to provide its functionality.

FIG. 2.2 shows a diagram of a backup storage characteristics (220) data structure in accordance with one or more embodiments of the invention. As discussed above, the backup storage characteristics (220) may include information regarding the operation of the backup storages over time.

In one or more embodiments of the invention, the backup storage characteristics (220) include any of number entries (e.g., 222, 230). The entries may be associated with respect to backup storages. Each of the entries may include a backup load availability (224), a communications load availability (226), and a computational load availability (228).

The backup load availability (224) may specify, over a period of time, the ability of the backup storage associated with the entry to perform additional backup workloads. For example, the backup load availability (224) may be a numerical number.

The communications load availability (226) may specify, over the period of time, the ability of the backup storage associated with entry to communicate with additional entities. For example, the communications load availability (226) may specify the available communications bandwidth, the number of available streams for communicating, and/or other characteristics of the ability of the backup storage to communicate with other devices.

The computational load availability (228) may specify, over the period of time, the availability of computing resources of the backup storage associated with the entry. For example, the computational load availability (228) may specify a quantity of available processor cycles, memory space, storage space, etc.

Each of these components (i.e., 224, 226, 228) of an entry may specify its aforementioned availability over a period of time. The availabilities may be specified with any level of granularity over the period of time without departing from the invention.

While the backup storage characteristics (220) have been described as including a limited amount of specific information, the backup storage characteristics (220) may include additional, less, and/or different information without departing from the embodiments disclosed herein. Further, the backup storage characteristics (220) may be combined, subdivided into any number of data structures, may be stored in other locations (e.g., in a storage hosted by another device), and/or spanned across any number of devices without departing from the embodiments disclosed herein. Additionally, while described as being implemented using a list of entries (222, 230), the backup storage characteristics (220) may be implemented using different types of data structures (e.g., databases, linked lists, tables, etc.) without departing from the invention.

FIG. 2.3 shows a diagram of a backup windows (240) data structure in accordance with one or more embodiments of the invention. As discussed above, the backup windows (240) may include information that may be used to assign backup storages to service backup workloads.

In one or more embodiments of the invention, the backup windows (240) include any number of entries (e.g., 242, 250). Each of the entries may include a backup storage identifier (244), window time characteristics (246), and backup capabilities (248).

The backup storage identifier (244) may be an identifier of a backup storage associated with the window. In other words, an identifier of the backup storage for which a backup window has been predicted by the predictor of FIG. 2.1.

The window time characteristics (246) may indicate characteristics of a backup window. For example, the window time characteristics (246) may specify a start, stop, duration, etc. of a backup window.

The backup capabilities (248) may specify availabilities, similar to those described with respect to FIG. 2.2, that the backup storage identified by the backup storage identifier (244) are likely to have during the backup window specified by the window time characteristics (246). For example, the backup capabilities (248) may specify (i) a communication bandwidth, (ii) a number of supportable concurrent streams, (iii) a quantity of computing resources, and/or (iv) a number of supportable backup workloads. These capabilities, in combination with the window time characteristics (246), may be utilized by the backup organizer to select an appropriate backup storage to service a backup workload.

While the backup windows (240) have been described as including a limited amount of specific information, the backup windows (240) may include additional, less, and/or different information without departing from the embodiments disclosed herein. Further, the backup windows (240) may be combined, subdivided into any number of data structures, may be stored in other locations (e.g., in a storage hosted by another device), and/or spanned across any number of devices without departing from the embodiments disclosed herein. Additionally, while described as being implemented using a list of entries (242, 250), the backup windows (240) may be implemented using different types of data structures (e.g., databases, linked lists, tables, etc.) without departing from the invention.

Returning to FIG. 1, the backup orchestrator (110) may provide backup orchestration services for the production hosts (130). FIGS. 3.1-3.2 illustrate methods that may be performed by the backup orchestrator (110) of the system of FIG. 1 when providing backup orchestration services.

FIG. 3.1 shows a flowchart of a method in accordance with one or more embodiments of the invention. The method depicted in FIG. 3.1 may be used to obtain backup windows in accordance with one or more embodiments of the invention. The method shown in FIG. 3 may be performed by, for example, a backup orchestrator (e.g., 110, FIG. 1). Other components of the system illustrated in FIG. 1 may perform all, or a portion, of the method of FIG. 3.1 without departing from the invention.

While FIG. 3.1 is illustrated as a series of steps, any of the steps may be omitted, performed in a different order, additional steps may be included, and/or any or all of the steps may be performed in a parallel and/or partially overlapping manner without departing from the invention.

In step 300, backup storage characteristics during a first time period are obtained.

In one or more embodiments of the invention, the backup storage characteristics are obtained from a backup storage. The backup storage characteristics may be similar to those described with respect to FIG. 2.2. The first period of time may be of any duration.

The backup storage characteristics may be obtained, for example, by the backup storage sending the backup storage characteristics in a message to the backup orchestrator. The backup storage characteristics may be obtained via other methods (e.g., reading a data structure in which the backup storage characteristics are stored) without departing from the invention.

In step 302, backup windows are predicted during a second period of time using the backup storage characteristics. As discussed above, the backup orchestrator may invoke the functionality of the predictor of the backup orchestrator to generate the backup windows.

When the functionality of the predictor is invoked, the predictor may take, as input, the backup storage characteristics. To generate the backup windows, the predictor may use the backup storage characteristics as a training set of data to train a model. The predictor may then, use as input to the trained model, the second period of time. The model may then generate the backup windows based on the second period of time.

The second period of time may be in the future (e.g., after the first period of time). For an example of generating backup windows, refer to FIGS. 4.1-4.3.

As discussed above, the backup windows may specify any number of periods of time during which backup storages associated with the periods of time are likely able to service backup workloads. The backup windows may be similar to those described with respect to FIG. 2.3.

The method may end following step 302.

Via the method illustrated in FIG. 3.1, one or more embodiments of the invention may facilitate the identification of periods of time during which backup generation workloads, when appropriately assigned to backup storage, are likely to be serviced in a manner that enables production hosts to be more likely to meet their data protection goals.

FIG. 3.2 shows a flowchart of a method in accordance with one or more embodiments of the invention. The method depicted in FIG. 3.2 may be used to provide backup services in accordance with one or more embodiments of the invention. The method shown in FIG. 3.2 may be performed by, for example, a backup orchestrator (e.g., 110, FIG. 1). Other components of the system illustrated in FIG. 1 may perform all, or a portion, of the method of FIG. 3.2 without departing from the invention.

While FIG. 3.2 is illustrated as a series of steps, any of the steps may be omitted, performed in a different order, additional steps may be included, and/or any or all of the steps may be performed in a parallel and/or partially overlapping manner without departing from the invention.

In step 310, an occurrence of a backup generation event for an entity is identified. The backup generation event may be, for example, a backup policy that specifies when a backup for the entity is to be generated. For example, the backup policy may specify that a backup is to be generated at a predetermined point in time.

To identify the occurrence of the backup generation event, the backup orchestrator may monitor, for example, (i) the current time, (ii) a quantity of unbacked up data of the entity, and/or (iii) other characteristics of the entity that may trigger a backup generation.

In step 312, workload characteristics for generating a backup for the entity are matched to a backup window. As discussed with respect to FIGS. 2.3 and 3.1, each backup window may be associated with capabilities of a backup storage associated with the backup window that are likely to be available during the backup window. The workload characteristics may be matched to a backup window by identifying a backup window, which is associated with capabilities that exceed the requirements of the workload characteristics. The backup window may also be the earliest available that meets these criteria (i.e., both the earliest and the capabilities associated with the window indicate that the backup storage can complete the backup workload that will be imposed on it).

The workload characteristics may be obtained from the entity. The workload characteristics may be obtained from the entity by requesting them from the entity. The workload characteristics may be obtained via other methods without departing from the invention.

In step 314, the backup for the entity is generated during the backup window.

In one or more embodiments of the invention, the backup orchestrator sends a message to the entity to orchestrate generation and storage of the backup. The message may specify (i) when to generate a backup and (ii) the backup storage to use to store the generated backup. The aforementioned information may be based on the workload window matched in step 312.

In response to receiving the message, the entity may generate the backup and store the backup as specified by the message. By doing so, the backup orchestrator may cause the backup to be generated and stored in a storage that is likely to be able to service the backup workload associated with storing the generated backup in the backup storage.

The method may end following step 314.

Via the method illustrated in FIG. 3.2, one or more embodiments of the invention may facilitate the backup generation and storage in a manner that is unlikely to negatively impact the ability of production hosts to meet the data protection goals. For example, the backup storages assigned to service the storage needs of the production hosts are more likely to have sufficient capabilities to service the backup workloads imposed by the production hosts.

To further clarify embodiments of the invention, a non-limiting example is provided in FIGS. 4.1-4.3. FIG. 4.1 shows a diagram of an example system similar to that of FIG. 1. FIGS. 4.2-4.3 illustrate identification of backup windows and assignment of backup storages for servicing backup workloads based on the backup windows. For the sake of brevity, only a limited number of components of the system of FIG. 1 are illustrated in FIG. 4.1.

Example

Consider a scenario as illustrated in FIG. 4.1 in which a system includes two production hosts (400, 402). The first production host (400) hosts a database that requires both high stream numbers and high computing resource availability of a backup storage to service backup workloads that it generates. Two backup storages (404, 406) may be tasked with providing backup storage services to the production hosts (400, 402) and other entities not illustrated in FIG. 1.

As the system begins to operate, each of the production hosts host entities which begin to generate data that is in an unbacked up state. Consequently, backup windows need to be identified and backup storages need to be assigned to service the backup workloads of the production hosts.

FIGS. 4.2-4.3 show diagrams that illustrate a first period of time and a second period of time along a time line with time increasing from the left to right on the page. Demarcations (arrow pointing to 0, 1, 2, 3, 4, 5) are provided along the timeline to indicate periods of time.

Turning to FIG. 4.2, at a first point in time, a backup orchestrator (not shown) requests backup storage characteristics from the first backup storage (404). In response to the request, the first backup storage (404) provides its backup storage characteristics including its computing resource availability and stream availability.

Both of these characteristics are plotted along the timeline over the first time period. The magnitude of the computing resource availability and stream availability are illustrated as the distance of the plotted line away from the time line. For example, between 1 and 3, the computing resource availability is large while between time 3 and 4 the computing resource availability is small. The stream availability is low until time 2 at which point the stream availability increases to large until just before time 4. The computing resource availability of the first backup storage (404) varies over time due to services that it is providing to other production hosts.

After obtaining the computing resource availability, the backup orchestrator uses the computing resource availability as input to its predictor and generates a model that may be used to predict when backup windows for the first backup storage (404) will occur in the future. Using the model, the backup orchestrator identifies two backup windows (410, 412, FIG. 4.3) that will occur in the future.

As seen from FIG. 4.3, a first backup window (410) and a second backup window (412) for the first backup storage (404) occur during the second period of time. However, the capabilities of the first backup storage (404) during these time periods are different. During the first backup window (410), the backup orchestrator predicts that the first backup storage (404) will have high stream availability, but low computing resource availability. In contrast, during the second backup window (412), the backup orchestrator predicts that the first backup storage (404) will have both high stream availability and high computing resource availability.

Based on this determination, the backup orchestrator assigns the first backup storage (404) to provide backup storage services to the first production host (400) during the second backup window (412) even though the second backup window (412) occurs later in time when compared to the first backup window (410). However, by doing so it is more likely that the first backup storage (404) will be able to service the backup workload imposed by the first production host (400) when it generates a backup when compared to if backup services were provided during the first backup window (410).

End of Example

Figure 5:
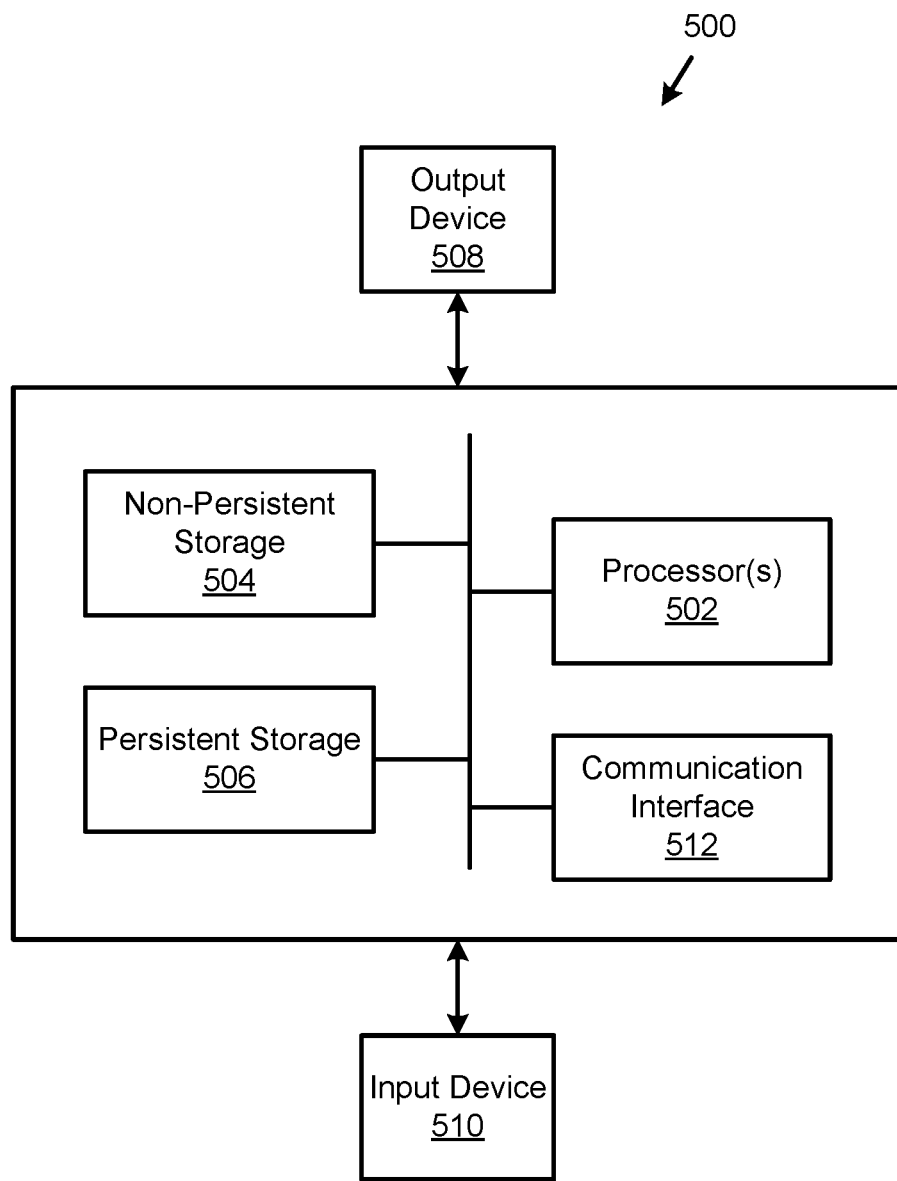
FIG. 5 shows a diagram of a computing device in accordance with one or more embodiments of the invention.

Any of the components of FIG. 1 may be implemented as distributed computing devices. As used herein, a distributed computing device refers to functionality provided by a logical device that utilizes the computing resources of one or more separate and/or distinct computing devices. As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Embodiments of the invention may provide a system that provides backup services in a manner that are likely to enable entities to meet their data protection goals. Specifically, embodiments of the invention may provide a method of selecting a backup storage in which to store a backup that is likely to have sufficient computing resources to complete the backup storage in a desired amount of time. By doing so, production hosts may avoid delays in storing backups that may otherwise cause the production hosts to miss their data protection goals. For example, delays in storing backups may cause a quantity of data of a production host to be in an unbacked up state to exceed a maximum amount allowed.

Thus, embodiments of the invention may address the problem of the limited availability of computational resources in a distributed system that relies on data redundancy for data protection purposes. Specifically, embodiments of the invention may provide a method of allocating resources (e.g., backup storages) in a manner that prevents or reduces the likelihood of unexpected data storage delays from occurring.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A backup orchestrator for providing backup services to entities, comprising:
    storage for storing backup windows during which backup storages are predicted to be able to service backup storage workloads; and
    a backup manager programmed to:
        identify an occurrence of a backup generation event for an entity of the entities;
        in response to identifying the backup generation event:
            match workload characteristics for generating a backup of the entity to a backup window of the backup windows that is associated with a backup storage of the backup storages; and
            generate the backup for the entity during the backup window and store the backup in the backup storage.

2. The backup orchestrator of claim 1, wherein the backup manager is further programmed to:
    prior to identifying the occurrence of the backup generation event for the entity:
        obtain backup storage characteristics of the backup storage for storing backups of the entity; and
        generate a portion of the backup windows associated with the backup storage using the backup storage characteristics.

3. The backup orchestrator of claim 2, wherein the backup storage characteristics comprise:
    a computational load availability over a first time period;
    a communications load availability over the first time period; and
    a backup load availability over the first time period.

4. The backup orchestrator of claim 3, wherein the communications load availability comprises:

a communication bandwidth available for allocation by the backup storage; and a number of streams available for allocation by the backup storage.

5. The backup orchestrator of claim 3, wherein the portion of the backup windows have durations that occur during a second period of time, wherein the second period of time occurs after the first time period.

6. The backup orchestrator of claim 5, wherein at least a sub-portion of the portion of the backup windows have durations that occur after the occurrence of the backup generation event.

7. The backup orchestrator of claim 1, wherein generating the backup for the entity during the backup window and storing the backup in the backup storage comprises:

instructing a production host that hosts the entity to:
generate the backup during the backup window; and
provide the backup to the backup storage.

8. A method for providing backup services to entities, comprising:

identifying an occurrence of a backup generation event for an entity of the entities;

in response to identifying the backup generation event:
matching workload characteristics for generating a backup of the entity to a backup window that is associated with a backup storage of the backup storages, wherein the backup window specifies a period of time during which the backup storage is predicted to be able to service backup storage workloads; and
generating the backup for the entity during the backup window and storing the backup in the backup storage.

9. The method of claim 8, wherein the method further comprises:

prior to identifying the occurrence of the backup generation event for the entity:
obtaining backup storage characteristics of the backup storage for storing backups of the entity; and
generating a portion of backup windows associated with the backup storage using the backup storage characteristics, wherein the backup window is a member of the portion of the backup windows.

10. The method of claim 9, wherein the backup storage characteristics comprise:

a computational load availability over a first time period;
a communications load availability over the first time period; and
a backup load availability over the first time period.

11. The method of claim 10, wherein the communications load availability comprises:

a communication bandwidth available for allocation by the backup storage; and
a number of streams available for allocation by the backup storage.

12. The method of claim 10, wherein the portion of the backup windows have durations that occur during a second period of time, wherein the second period of time occurs after the first time period.

13. The method of claim 12, wherein at least a sub-portion of the portion of the backup windows have durations that occur after the occurrence of the backup generation event.

14. The method of claim 8, wherein generating the backup for the entity during the backup window and storing the backup in the backup storage comprises:

instructing a production host that hosts the entity to:
generate the backup during the backup window; and
provide the backup to the backup storage.

15. A non-transitory computer readable medium comprising computer readable program code, which when executed by a computer processor enables the computer processor to perform a method for providing backup services to entities, the method comprising:

identifying an occurrence of a backup generation event for an entity of the entities;

in response to identifying the backup generation event:
matching workload characteristics for generating a backup of the entity to a backup window that is associated with a backup storage of the backup storages, wherein the backup window specifies a period of time during which the backup storage is predicted to be able to service backup storage workloads; and
generating the backup for the entity during the backup window and storing the backup in the backup storage.

16. The non-transitory computer readable medium of claim 15, wherein the method further comprises:

prior to identifying the occurrence of the backup generation event for the entity:
obtaining backup storage characteristics of the backup storage for storing backups of the entity; and
generating a portion of backup windows associated with the backup storage using the backup storage characteristics, wherein the backup window is a member of the portion of the backup windows.

17. The non-transitory computer readable medium of claim 16, wherein the backup storage characteristics comprise:

a computational load availability over a first time period;
a communications load availability over the first time period; and
a backup load availability over the first time period.

18. The non-transitory computer readable medium of claim 17, wherein the communications load availability comprises:

a communication bandwidth available for allocation by the backup storage; and
a number of streams available for allocation by the backup storage.

19. The non-transitory computer readable medium of claim 17, wherein the portion of the backup windows have durations that occur during a second period of time, wherein the second period of time occurs after the first time period.

20. The non-transitory computer readable medium of claim 19, wherein at least a sub-portion of the portion of the backup windows have durations that occur after the occurrence of the backup generation event.

* * * * *